US012630252B2

(12) United States Patent
Balaban

(10) Patent No.: US 12,630,252 B2
(45) Date of Patent: May 19, 2026

(54) TWIN SCOOTER

(71) Applicant: Michelle Balaban, Voorhees, NJ (US)

(72) Inventor: Michelle Balaban, Voorhees, NJ (US)

( * ) Notice: Subject to any disclaimer, the term of this patent is extended or adjusted under 35 U.S.C. 154(b) by 302 days.

(21) Appl. No.: 18/625,810

(22) Filed: Apr. 3, 2024

(65) Prior Publication Data

US 2024/0336321 A1 Oct. 10, 2024

Related U.S. Application Data

(60) Provisional application No. 63/494,259, filed on Apr. 5, 2023.

(51) Int. Cl.
B62K 3/00 (2006.01)
B62K 15/00 (2006.01)

(52) U.S. Cl.
CPC ............ B62K 3/002 (2013.01); B62K 15/006 (2013.01)

(58) Field of Classification Search
CPC .............................. B62K 3/002; B62K 15/006
See application file for complete search history.

(56) References Cited

U.S. PATENT DOCUMENTS 6,808,187 B1 * 10/2004 Harris
7,588,256 B1 9/2009 Turk

| 10,167,038 | B2 * | 1/2019 | Kim |
| 10,486,763 | B2 * | 11/2019 | Koo |
| 11,465,707 | B2 * | 10/2022 | Malheiro |
| 11,970,239 | B2 * | 4/2024 | McGowan |
| 2009/0289431 | A1 | 11/2009 | Geeslin |
| 2010/0038887 | A1 | 2/2010 | Bar-Lev |
| 2013/0049331 | A1 | 2/2013 | Di Carimate et al. |
| 2014/0008882 | A1 * | 1/2014 | Liao |
| 2018/0237094 | A1 | 8/2018 | Fischer |
| 2019/0176866 | A1 | 6/2019 | Day |
| 2020/0223469 | A1 | 7/2020 | Chaudeurge |
| 2020/0385043 | A1 | 12/2020 | Young et al. |
| 2023/0150601 | A1 | 5/2023 | Vaney et al. |

FOREIGN PATENT DOCUMENTS

| CN | 102963475 A | 3/2013 | |
| CN | 103879496 A | 6/2014 | |
| CN | 203996633 U | 12/2014 | |
| CN | 204021133 U | 12/2014 | |
| CN | 204355245 U | 5/2015 | |
| CN | 206691292 U | 12/2017 | |
| CN | 210212639 U | 3/2020 | |
| FR | 2822794 A1 * | 10/2002 | ............. B62K 3/002 |
| FR | 2921337 A1 * | 3/2009 | ............. B62K 3/002 |

* cited by examiner

*Primary Examiner* — James A Shriver, II
*Assistant Examiner* — Nicholas R. Kandas
(74) *Attorney, Agent, or Firm* — PAUL & PAUL

(57) ABSTRACT

A twin scooter includes a generally planar base formed from a first and a second section joined by a hinge. Support handles project from the front of both the first and second sections to permit a pair of children to scoot simultaneously, while a push handle at the rear of the scooter provides adult control of the scooter.

7 Claims, 2 Drawing Sheets

TWIN SCOOTER

BACKGROUND OF THE INVENTION

1. Field of the Invention

The present invention relates to the field of children's toys.

2. Brief Description of the Prior Art

Scooters have become ubiquitous. From being a simple accoutrement of every childhood, to becoming a form of general transportation, enabled by availability of small, high torque electric motors and lithium batteries. Nevertheless, children's scooters have remained very popular. Both two- and three-wheel designs are available to help teach small children gross motor skills including balance and coordination. For younger children, parent-assisted riding toys are available, as in the iconic little red wagon. Families with multiple young children would value having a toy that permits active use by a pair of young children while enabling parental control.

SUMMARY OF THE INVENTION

The present invention provides a scooter comprising a generally planar base, which has an upper surface, an underside, a front, and a rear. The base preferably includes a first section and a second section.

The first section and the second section are preferably substantially mirror images of each other. The first section and second section are preferably rotatably joined to one another such that either one of the first and second sections can be rotated between an open position in which the first section and the second section are coplanar, and a closed position in which one of the first and second sections lies upon the other of the first section and the second section;

The scooter further preferably includes a plurality of castors affixed to the underside of the base, as well as at least one support handle and at least one push handle. The at least one first support handle preferably includes a first generally vertical post releasably affixed to the base proximate the front of the base, and a grip adjustably affixed to the first generally vertical post. The at least one push handle preferably includes a second post affixed to the base proximate the rear of the base.

Preferably, the scooter also includes at least one additional support handle including a third generally vertical post releasably affixed to the base in between the front of the base and the rear of the base, and a grip adjustably affixed to the third post.

In one aspect of the present invention, the base is preferably generally rectangular. In another aspect of the present invention, the push handle preferably includes a grip releasably affixed to the second post. In another aspect of the present invention the castors are preferably rotatable about a vertical axis. In yet another aspect of the present invention a castor is preferably provided proximate each corner of the base and at least one castor is preferably provided proximate the center of the base.

DETAILED DESCRIPTION

The present invention provides a twin scooter permitting two children to cooperatively enjoy the physical pleasure of scooting while learning balance and coordination, while simultaneously providing an opportunity for adult guidance. The scooter permits a child to place one foot on the scooter and propel the scooter forward with the other foot. A pair of children can push off from opposite sides of the scooter, or from the same side. Alternatively, one child can push, while another rides with both feet on the scooter. For example, an older child may position herself or himself on the front portion of the scooter while their younger sibling rides in back.

The twin scooter preferably is constructed so that the scooter can be quickly disassembled for storage. In particular, the base of the scooter is preferably formed from a pair of sections connected by a hinge so that one section can be rotated and placed atop the other section.

The base of the scooter is preferably provided with a plurality of castors positioned so that each section of the scooter is independently supported by a set of castors.

Figure 3:
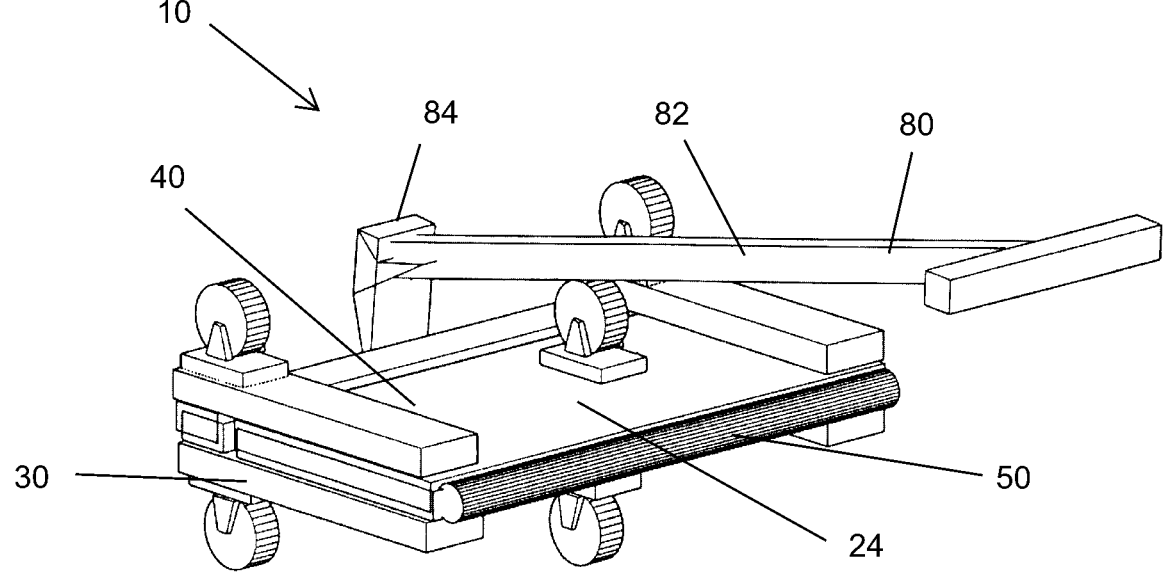
FIG. 3 is a front perspective view of the twin scooter of FIG. 1 as seen from above and the front and right side, shown in a collapsed state for storage or transportation.

Preferably, the scooter includes at least two support handles for children to hold on to as they scoot. The position of the grips on the support handles are preferably adjustable along a supporting post so that they can be adjusted to fit the reach of children of different heights. The support handles are preferably removable from the base of the scooter to permit one section of the base to be rotated over the other section of the scooter for storage (FIG. 3).

The scooter also is preferably provided with a push handle extending from the rear of the scooter to permit adult control of the direction and speed of the child-driven scooter. The push handle is preferably rotatable about an axis proximate the base of the scooter so that the push handle can be rotated over the bottom of the base when the scooter is to be stored when not in use. Preferably, the push handle is formed from at least two tubular sections that can be easily disassembled for storage. Preferably, the height of the push handle is adjustable, permitting the push handle to be adjusted to fit multiple users. In one aspect, the push handle is formed from telescoping tubing which can be adjusted and locked in place at a user-desired extension.

Figure 1:
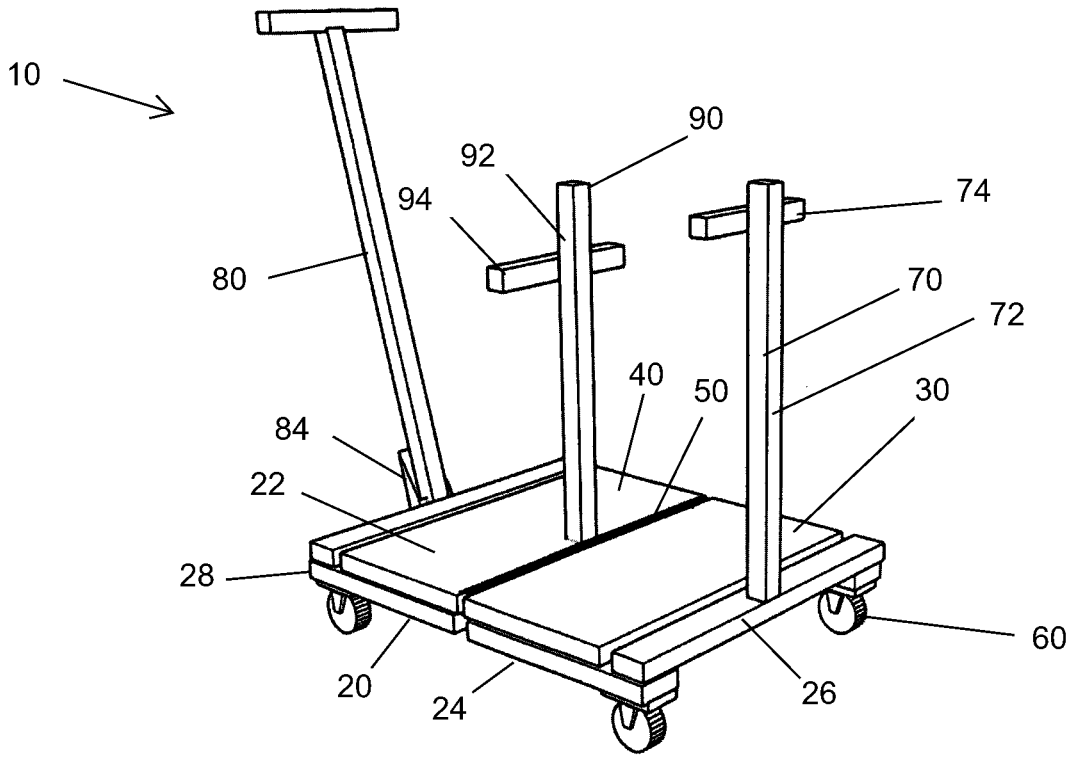
FIG. 1 is a perspective view of a twin scooter according to the present invention as seen from above and the front and right side shown ready to ride.

A perspective view of a presently preferred embodiment of the twin scooter 10 of the present invention is shown in FIG. 1. The scooter 10 includes a generally planar base 20, which has a front 26, a rear 28, and an underside 24, as well as an upper surface 22, which is preferably at least partially formed from a non-skid material to provide a non-slip surface for securely receiving a child's foot.

The base 20 is formed from a pair of sections 30, 40 connected together with a hinge 50 such that the first section 30 can be rotated on the hinge to lie atop the second section 40 when the scooter 10 is disassembled for storage.

The scooter 10 also includes a first support handle 70 positioned proximate the front of the first section 30 formed from a first generally vertical post 72 and a cross-piece or grip 74 to receive a first child's hands while scooting. The grip 74 is preferably adjustable in position along the first post 72 to match the reach of the scooting child and lockable to the first post.

The scooter 10 is also preferably provided with a push handle 80 provided proximate the rear of the section 40 of the base 20 formed from a second post 82 and a grip. Preferably, the push handle 80 is rotatably mounted on a bracket 84 so that the push handle can be rotated from a pushing position in which the push handle 80 extends upward and backward from the second section 40 to a storage location in which the push handle 80 lies atop the underside of the first section 30.

Preferably, the push handle is formed from at least two interlocking sections which can be disassembled from storage. Preferably, the angle at which the push handle 80 forms in the pushing position can be adjusted to the height of the adult controlling the operation of the scooter, and the length of the push handle 80 can be adjusted as well, preferably such that the push handle 80 can be locked in place at the desired angle and extension.

The scooter 10 also preferably includes a second support handle 90 positioned proximate the front of the second section 40 of the base 20 for use by a second child using the scooter 10. The second support handle 90 also includes a third, generally vertical, post 92 and a second grip 94. The second grip 94 is also preferably adjustable in position along the third post 92 to match the reach of the second child and lockable to the third post 92. Both the first support handle 70 and the second support handle 90 are releasably affixed to the base 20 such that they can be easily removed from base for storage.

Figure 2:
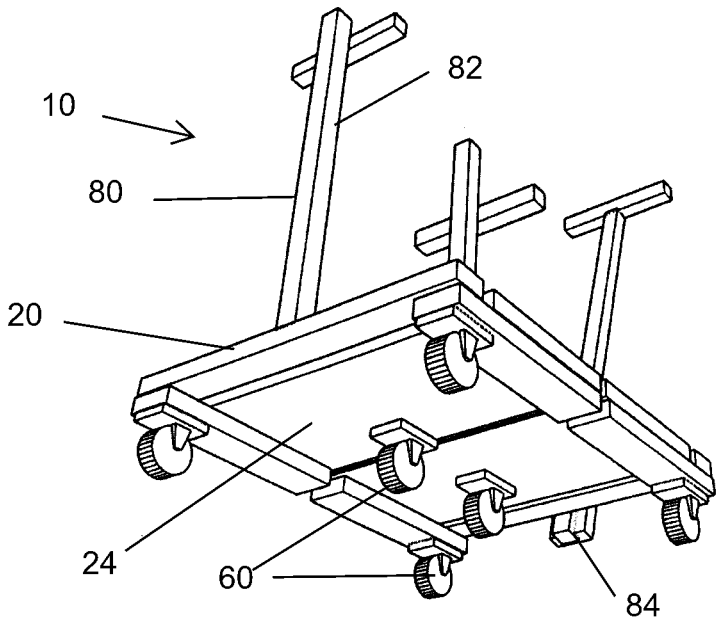
FIG. 2 is a perspective view of the twin scooter of FIG. 1 as seen from below and the rear and right side.

The scooter 10 is also preferably provided with a plurality of castors 60 on the underside 24 of the base 20, best seen in the bottom perspective view of FIG. 2. Preferably, a pair of castors 60 are placed proximate the front of the base 26 proximate the corners and a pair of castors are placed proximate the rear of the base 28 proximate the corners, such that both the front section 26 and the rear section of the base 28 include at least a pair of castors 60. Preferably, a third castor 60 is provided proximate the rear of the first section 30 as well as the front of the rear section 40 such that each section 30, 40 of the base 20 is supported by at least three castors 60, with two castors 60 proximate the center of the base 20. Preferably, the wheel of each castor 60 is mounted such that the wheel can pivot 360 degrees around a vertical axis, permitting the scooter 10 to be moved in any direction.

Alternatively, the third castor 60 on each section 30, 40 of the base 20 can be omitted, and a releasable lock can be provided on the underside 24 of the base 20 to lock the first section 30 to the second section 40 in common horizontal orientation.

Many changes can be made in the above-described invention without departing from the intent and scope thereof. For example, while the base shown provided in the presently preferred embodiment described above is rectangular, a different shape of the base can be selected for an aesthetic or other reasons (e.g., hourglass, oval, or the like). It is, therefore, intended that the above description be read in the illustrative sense and not in the limiting sense. Substitutions and changes can be made while still being within the scope and intent of the invention and of the appended claims.

The invention claimed is:

1. A twin scooter comprising:
a generally planar base;
the base having an upper surface, an underside, a front and a rear;
the base including a first section and a second section, the first section and the second section being mirror images of each other, the first section and the second section being rotatably joined to one another such that either one of the first and second sections can be rotated between an open position in which the first section and the second section are coplanar, and a closed position in which one of the first and second sections lies upon the other of the first section and the second section;
the scooter further comprising:
a plurality of castors affixed to the underside of the base;
at least one first support handle including a first generally vertical post releasably affixed to the base proximate the front of the base, and a first grip adjustably affixed to the first generally vertical post; and
at least one push handle including a second post affixed to the base proximate the rear of the base.

2. The twin scooter according to claim 1 further comprising at least one additional support handle including a third generally vertical post releasably affixed to the base in between the front of the base and the rear of the base, and a grip adjustably affixed to the third post.

3. The twin scooter according to claim 1 wherein the base is generally rectangular.

4. The twin scooter according to claim 1 wherein the push handle includes a grip releasably affixed to the third post.

5. The twin scooter according to claim 1 wherein the castors are rotatable about a vertical axis.

6. The twin scooter according to claim 3 wherein a castor is provided proximate each corner of the base and at least one castor is provided proximate the center of the base.

7. The twin scooter according to claim 1 wherein the push handle is rotatably mounted on a bracket.

* * * * *